Figure 1:
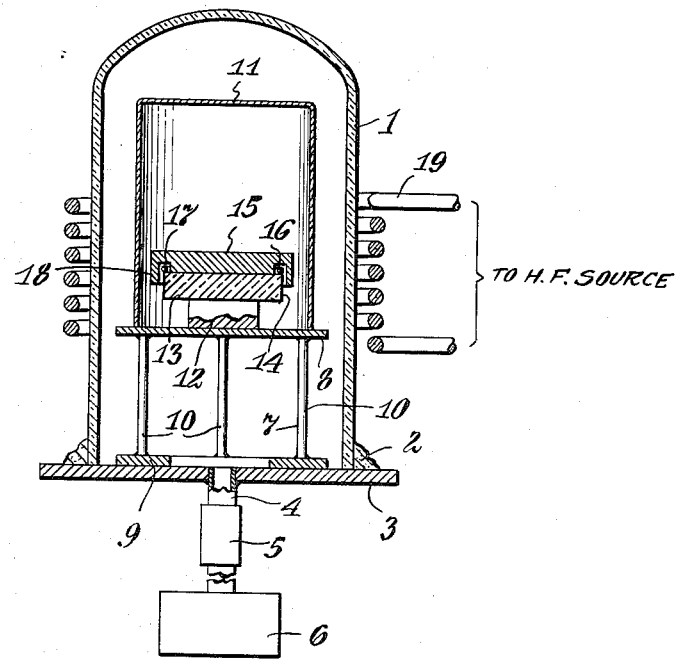

Nov. 29, 1955 W. J. KNOCHEL ET AL 2,724,892
METHOD FOR FORMING METAL TO CERAMIC SEAL
Filed Nov. 14, 1950

INVENTORS
W. J. KNOCHEL,
M. EBER,
H. J. EHRINGER.
BY
ATTORNEY

United States Patent Office 2,724,892
Patented Nov. 29, 1955

2,724,892

METHOD FOR FORMING METAL TO CERAMIC SEAL

William J. Knochel and Mortimer Eber, East Orange, and Hermann J. Ehringer, Newark, N. J., assignors to Westinghouse Electric Corporation, East Pittsburgh, Pa., a corporation of Pennsylvania Application November 14, 1950, Serial No. 195,692

2 Claims. (Cl. 29—472.9)

This invention relates to seal construction and method of manufacture, and specifically refers to the means and method of making a vacuum-tight metal ceramic joint in electrical apparatus, such as electronic tubes and the like.

Reference is made to pending application for Letters Patent of the United States Serial No. 182,593, filed August 31, 1950, by Mortimer Eber for "Production of Seals Between Metals and Ceramics," assigned to the same assignee, wherein the currently used method of the prior art is disclosed.

Said method follows the procedure of painting a ceramic disc with either zirconium or titanium hydride, or both, fitting the painted disc to a metal cylinder, positioning the proper solder between the metal cylinder and painted disc, and then induction heating to join the above mentioned members in a vacuum or purified inert gas, such as argon, nitrogen or the like, using suitable holding and heat shield fixtures. Although satisfactory seals are produced by this above method, it has been found that after a temperature of 400–450° C. is reached, most of the hydrogen has left the zirconium or titanium hydride, leaving a very active metal surface for gettering (i. e. absorbing) such gases as water vapor, nitrogen, oxygen, carbon dioxide, and carbon monoxide. In some cases when excessive amounts of gas are given off during the induction heating process, the zirconium or titanium will form solid solutions with the above-mentioned gases and is unable to alloy properly with the solder. When this occurs, intimate contact between metal cylinder and the painted disc is impossible and a vacuum-tight joint cannot be effected. Again, if during the fitting of the painted disc to the metal cylinder, due to eccentricity of the parts, zirconium or titanium hydride is chipped or scratched off the painted surface, as a consequence of which the solder, when it flows, will not alloy and make intimate contact with the painted surface at the chipped or scratched portions of the surface which are devoid of hydride. Thus, a small scratch or chip extending in one spot the thickness of the painted disc could prevent a vacuum-tight joint between the metal cylinder and the painted disc. Hence it has been found advantageous to so prepare the painted coating on the surface area to be joined of said disc as to prevent scratching and chipping of said coating during handling and fitting of said disc to said cylinder and to prevent it from absorbing during joining to said cylinder deleterious gases which tend to reduce the wetting property of the coating and the effectivness of the ultimate seal.

An object of the present invention is the coating of the surface area to be joined of the ceramic disc, with an alloy of a plurality of metals of which one is silver and one or more are metals reduced from hydrides of metals of the group consisting of zirconium, titanium, tantalum, columbium, vanadium and thorium.

The invention further contemplates the smooth uninterrupted coating of the surface area to be joined of the ceramic disc with said alloy to prevent gettering action of zirconium or the like and the formation of solid solutions with deleterious gases produced by induction heating the metal cylinder, painted ceramic disc and solder.

A further object of the invention is to provide a durable coating on the surface area to be joined of the ceramic disc with said alloy to prevent chipping and scraping during handling and assembling of the painted ceramic and the metal cylinder.

Another object of the invention is a ceramic disc having a surface area to be coated, said area having a smooth uninterrupted coating of durable alloy of a plurality of metals, one of which is silver and one or more are metals reduced from the hydride of metals of the group consisting of zirconium, titanium, tantalum, columbium, vanadium and thorium.

A further object of the invention is to provide a ceramic to metal seal comprising a hollow metal cylinder and a ceramic disc, said disc having a surface area to be joined to said cylinder, said area having a smooth uninterrupted coating of durable alloy of a plurality of metals, one of which is silver and one or more are metals reduced from hydrides of metals of the group consisting of zirconium, titanium, tantalum, columbium, vanadium, or thorium, and a solder between and uniting said hollow metal cylinder and alloy coated ceramic disc.

Other objects of the invention will appear to those skilled in the art to which it appertains as the description thereof proceeds, both by direct recitation thereof and by implication from the context.

Referring to the accompanying drawing in which like numerals or reference indicate similar parts throughout the several views, Fig. 1 is a section of an arbitrarily selected form of electrical device, namely an induction heating equipment for metallizing the painted ceramic with a solder, wherein our invention is included.

Figure 2:
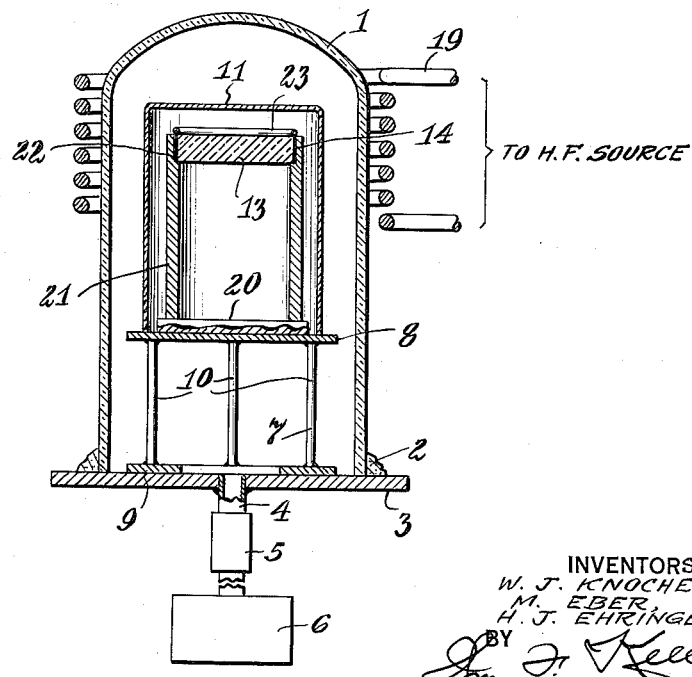

Fig. 2 is also a section of an arbitrarily selected induction heating equipment differing from Fig. 1 in the holding fixture and insulator required to join a metallized ceramic to a metal cylinder machined to fit said metallized ceramic.

Referring to said drawing, Fig. 1, the induction heating device comprises a high silica glass or quartz vacuum dome or bottle 1 sealed at its open-ended bottom with a vacuum sealing putty 2 to a circular brass supporting plate 3. Said plate 3 is soldered to an appropriate cylindrical brass exhaust pipe 4 connected in turn through a rubber hose 5 to a metal diffusion and backer pump combination 6 capable of evacuating said bottle 1 to a pressure of $1.0 \times 10^{-5}$ mm. of mercury.

Within said vacuum bottle 1 and supported by plate 3 is a tripod 7 consisting of parallel top and bottom discs 8 and 9 respectively held in spaced relation by intervening upright rods 10, said tripod 7 preferably of non-gaseous high melting point material such as molybdenum or 18–8 steel. Situated on the top surface of and supported by top disc 8 of tripod 7 is an inverted open-ended container functioning as a heat shield. As shown in Fig. 1, said container 11 is conveniently cylindrical in shape. Inside container 11, on the upper surface of top disc 8, and fastened thereto, is support 12, shown suitably here as cylindrical in shape, which supports the work, here shown as a zircon porcelain disc 13. Said ceramic disc 13 has been baked in air, painted on the surface area to be joined 14 with a wetting agent suspension, and then allowed to dry in the air or in a low temperature air furnace until said wetting agent suspension adheres to said surface area 14 of disc 13. Applied on the top surface of disc 13 is a flat round plate or fixture 15, functioning as a holding fixture for a ring of solder 16, either pure silver solder (melting point 960° C.) or appropriate silver copper alloy solder (melting point 779° C.) such as Handy and Harmon BT solder (72% silver—28% copper). Machined in the under face of said fixture 15 is a circular rectangular cross sectioned groove 17, the approximate diameter of said disc 13, and in this groove 17, as the fixture is assembled, is placed said ring of solder 16 on the peripheral edge of disc 13. Peripherally beyond the groove 17, the fixture 15 has an overhanging edge 18 which directs the flow of the solder 16, when it melts, along the painted surface area 14. The outside diameter of disc 13 is approximately two inches larger than that of the support 12 to provide a free-way for the excess of solder 16 to fall clear from the work onto top disc 8. Support 12 and fixture 15, mentioned above, are preferably non-gaseous, high melting point material, such as tantalum or 18–8 steel.

Applied coaxially around vacuum bottle 1 and extending symmetrically along the length of open-ended container 11 is an appropriate high frequency induction coil 19 which fits over vacuum bottle 1 with approximately ¼" clearance. Said coil 19 inductively heats container 11 which in turn raises by radiation the temperature of the included parts, namely support 12, disc 13, fixture 15, and solder 16 to the melting point of the solder 16. When the solder melts, it forms an alloy on the painted surface 14 of the disc 13, thereby metallizing said surface 14.

After cooling, metallized ceramic disc 13 is transferred from the induction heating equipment for metallizing said ceramic disc 13 (Fig. 1) to the induction heating equipment for joining metallized ceramic disc 13 to a hollow metal cylinder (Fig. 2).

Referring to Fig. 2 which differs from Fig. 1 solely in fixtures and members within container 11, and particularly to top disc 8 of tripod 7, there is supported on the upper surface of said disc 8 a zircon heat insulator 20, the purpose of which is the insulation of top disc 8 from the work, a hollow cylinder 21 of nickel-cobalt-iron. Said cylinder 21 is superimposed on the upper surface of insulator 20 and has an annular rabbet 22 machined in the upper end to receive and support concentrically metallized ceramic disc 13 with approximately .003" radial clearance. The flange portion of said rabbet 22 preferably has a wall thickness of approximately .010" so that the resulting joint of cylinder 21 and ceramic 13 when heated in its ultimate use will be in a state of compression.

On the top of and at the peripheral juncture between cylinder 21 and ceramic 13 an appropriate ring of solder 23, such as Handy and Harman BT solder (72% silver—28% copper), is positioned. Insulator 20, cylinder 21, as well as metallized ceramic disc 13 and solder 23 are coaxially aligned and in a state of parallelism with the sides of container 11. Again, as in Fig. 1, applied coaxially around vacuum bottle 1 and extending symmetrically along the length of container 11 is an appropriate high frequency induction coil 19 which is capable of heating said container 11 to a very high temperature. The included parts within container 11, namely, insulator 20 and the work, cylinder 21, metallized ceramic 13 and solder 23 are heated by radiation from container 11 to the melting point temperature of solder 23. When the solder 23 melts, it flows into the peripheral juncture of cylinder 21 and metallized ceramic 13, thereby forming upon cooling a vacuum-tight joint between cylinder 21 and metallized ceramic 13.

According to the present invention, we prepare the ceramic disc 13 for painting by heating said part in air to a temperature of approximately 1000° C. for ½ hour, to burn off undesirable impurities in the ceramic 13. Using a suitable suspension of zirconium hydride or titanium hydride powder or both in a vehicle such as equal parts by volume of ammyl acetate and acetone solution, with sufficient nitrocellulose binder to insure adhesion of the suspension to the ceramic 13, said suspension is painted on the surface area to be joined 14 of ceramic disc 13. The suspension on said surface 14 is left to dry in air at room temperatures or air fired at 100° C. for 5 minutes to evaporate the vehicle and cause adhesion of the zirconium hydride powder to surface area 14. The work, namely painted ceramic disc 13 and solder 16, is then positioned in the induction heating equipment described above with respect to Fig. 1 and bottle 1 evacuated to a pressure less than $0.5 \times 10^{-4}$ mm. of mercury. Induction heating causes the container 11 to become very hot and the included parts, namely, support 12, disc 13, fixture 15 and solder 16, are heated by radiation from said container 11 slowly to the required temperature necessary to melt the solder. At this temperature providing it is over 600° C. all of the zirconium hydride or titanium hydride or both has dissociated into pure zirconium or titanium, or both, on surface area 14 of disc 13. The liberated hydrogen from the reaction is evacuated from the bottle 1. The pure silver solder 16 has melted and with zirconium or titanium or both acting as a flux, flows over the entire surface area 14 thereby forming an alloy with either zirconium or titanium or both on the said surface area 14 of ceramic disc 13. The induction heating power is turned off and vacuum bottle 1 and contained parts are cooled to room temperature.

After cooling, the now metallized ceramic 13 is removed from the induction heating equipment in Fig. 1, and assembled for joining with the metal cylinder 21 and solder 23, as explained above in the induction heating equipment of Fig. 2. When the bottle 1 is evacuated to a pressure of $1.25 \times 10^{-5}$ mm. of mercury or lower, the container 11 is induction heated; sufficiently to raise the temperature of the included parts, namely, insulator 20, cylinder 21, metallized ceramic 13 and solder 23 by radiation from said container 11 slowly over a suitable period to a temperature of 830° C., when brazing with silver-copper eutectic. At this temperature the solder 23 will flow into the peripheral juncture of metal cylinder 21 and metallized ceramic 13, forming a vacuum-tight joint between said cylinder 21 and ceramic 13. The induction heating power then is turned off and vacuum bottle 1 and the container parts are cooled to room temperature.

It will be understood by those familiar with the art that the ceramic disc may also be painted with substitute suspensions containing a hydride of tantalum, thorium, vanadium, or columbium, or a plurality of the above hydrides thereof. For metallizing said ceramic we may also use copper, gold, lead, and aluminum and alloys thereof. With the metallized zircon porcelain ceramic, we also may use cylinders of zirconium, molybdenum or copper having an annular rabbet machined in the juncture end to receive said ceramic concentrically with .003" approximate radial clearance and having the flange portion of said rabbet thinned to a wall thickness of approximately .010" to allow flexibility and to create slight compression on the resulting seal. In the molybdenum case, after machining, but prior to joining, the inner surface of the molybdenum cylinder is usually but not necessarily successively plated with chromium, nickel and copper. If alumina porcelain Al–200 is employed as a ceramic, cylinders of tantalum, titanium or copper machined as mentioned above may be used. If the ceramic is made of American Lava Company's Alsimag 243 (steatite), cylinders of high-chrome stainless steel AISI #446 and #430 and Sealmet #4, a nickel-chrome alloy, machined and thinned as mentioned above may be used.

From the foregoing, it will be seen that we have devised an improved method of preparing a zircon porcelain or equivalent ceramic for sealing to nickel-cobalt-iron or equivalent cylinders by coating the surface area to be joined of said ceramic, with an alloy of a plurality of metals of which one is silver, copper, lead, gold or aluminum, and one or more metals reduced from the hydrides of metals of the group consisting of zirconium, titanium, tantalum, columbium, vanadium, and thorium. We have achieved a smooth uninterrupted, durable, surface of inactive metal alloy which will not getter such gases as water vapor, nitrogen, oxygen, carbon dioxide, or carbon monoxide during the joining of said ceramic and cylinder and will not chip or scrape off during the fitting of the ceramic to the cylinder. The solder used in joining, when it flows, will alloy and make intimate contact throughout the metallized surface and bridge said cylinder and metallized ceramic with a vacuum-tight joint.

Although preferred embodiments of our invention have been disclosed, it will be understood that modifications may be made within the spirit and scope of the appended claims.

We claim:

1. The method of coating a ceramic disc for sealing to a metallic surface comprising heating said disc in air to a temperature of approximately 1000° C. for one half hour to burn off undesirable impurities, mixing a suspension of a plurality of hydrides of metals of the group consisting of zirconium, titanium, tantalum, columbium, vanadian, and thorium in a mixture of a vehicle and binder, painting the surface area to be joined of said disc with said suspension, assembling said painted ceramic disc with a pure silver solder and heating said disc and solder in a protective atmosphere thereby reducing the metal hydrides on the surface area to be coated to the metals, melting the solder to form on said surface area a durable inactive alloy of silver and said metals on said surface, said inactive alloy being resistant to the formation of solid suspensions with deleterious gases at brazing temperatures and having a hardness resistant to chipping and scraping during handling.

2. The method of joining a ceramic cylindrical disc to a hollow metal cylinder, heating said disc in a temperature of approximately 1000° C. for one half hour to burn off undesirable impurities, mixing a suspension of a hydride of zirconium, in a mixture of a vehicle and binder painting the surface area to be joined of said disc with said suspension, assembling said painted disc with a pure silver solder and heating said disc and solder in a protective atmosphere thereby reducing to zirconium the zirconium hydride on the surface area to be joined of the disc, melting the solder to form on said surface area of said disc a durable inactive alloy of silver and the zirconium on said surface area, assembling the metallized disc with a hollow metal cylinder and a solder of the silver-copper alloy group, and heating said disc, cylinder and solder in a protective atmosphere thereby melting the solder and joining the disc and cylinder in a vacuum-tight joint.

References Cited in the file of this patent

UNITED STATES PATENTS

| | | |
|---|---|---|
| 1,958,967 | Kniepen | May 15, 1934 |
| 2,075,477 | Smith | Mar. 30, 1937 |
| 2,163,224 | Alexander | June 20, 1939 |
| 2,163,410 | Pulfrich | June 20, 1939 |
| 2,282,106 | Underwood | May 5, 1942 |
| 2,351,798 | Alexander | June 20, 1944 |
| 2,386,820 | Spencer | Oct. 16, 1945 |
| 2,454,270 | Braunsdorff | Nov. 23, 1948 |
| 2,563,391 | Browne | Aug. 7, 1951 |
| 2,570,248 | Kelly | Oct. 9, 1951 |
| 2,647,218 | Sorg | July 28, 1953 |
| 2,650,683 | McPhee | Sept. 1, 1953 |

OTHER REFERENCES

Bondley: "Electronics," July 1947, pgs. 97–99.

Pearsall: "Materials and Methods," July 1949, pgs. 61–62.

"Metal to Non-Metal Brazing," Pearsall "Chemical Abstracts," vol. 44, No. 5, March 10, 1950, pg. 1877.